Oct. 4, 1932.  C. C. SUNDERLAND  1,880,290
METHOD OF TRANSFERRING LOAD IN MAKING BRIDGES AND THE LIKE
Filed Jan. 9, 1931  2 Sheets-Sheet 1
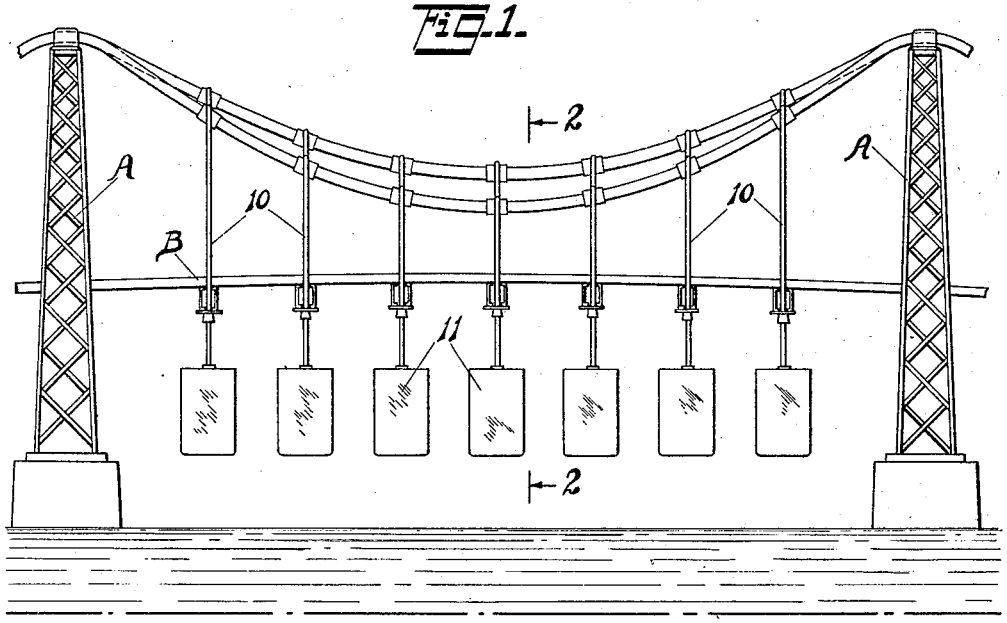
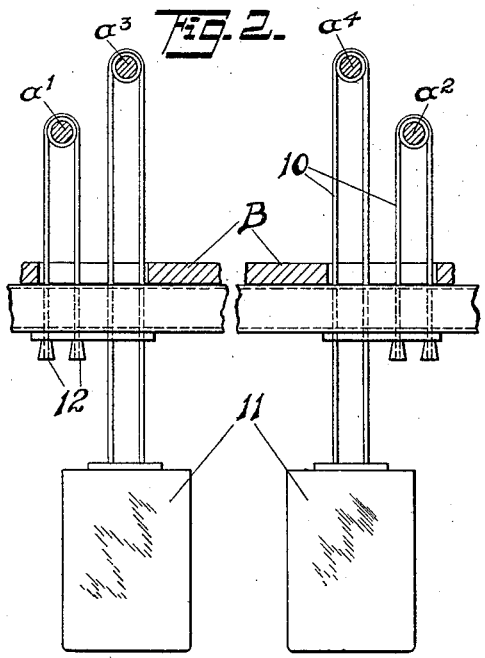
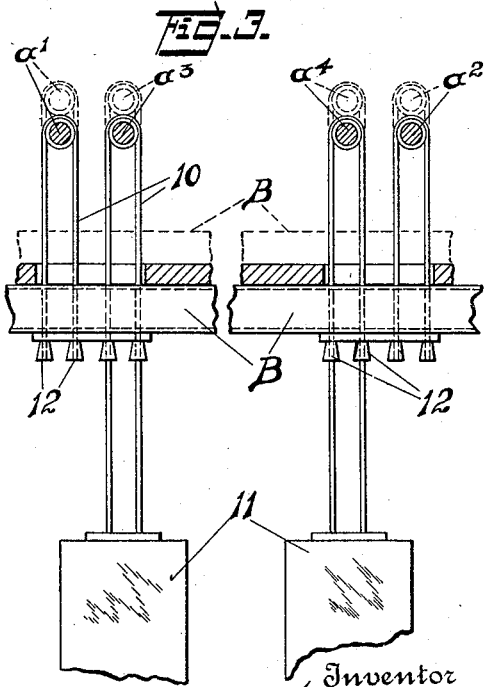
Inventor
Charles C. Sunderland
By his Attorneys
Philipp Sawyer Rice & Kennedy Oct. 4, 1932. C. C. SUNDERLAND 1,880,290
METHOD OF TRANSFERRING LOAD IN MAKING BRIDGES AND THE LIKE
Filed Jan. 9, 1931 2 Sheets-Sheet 2
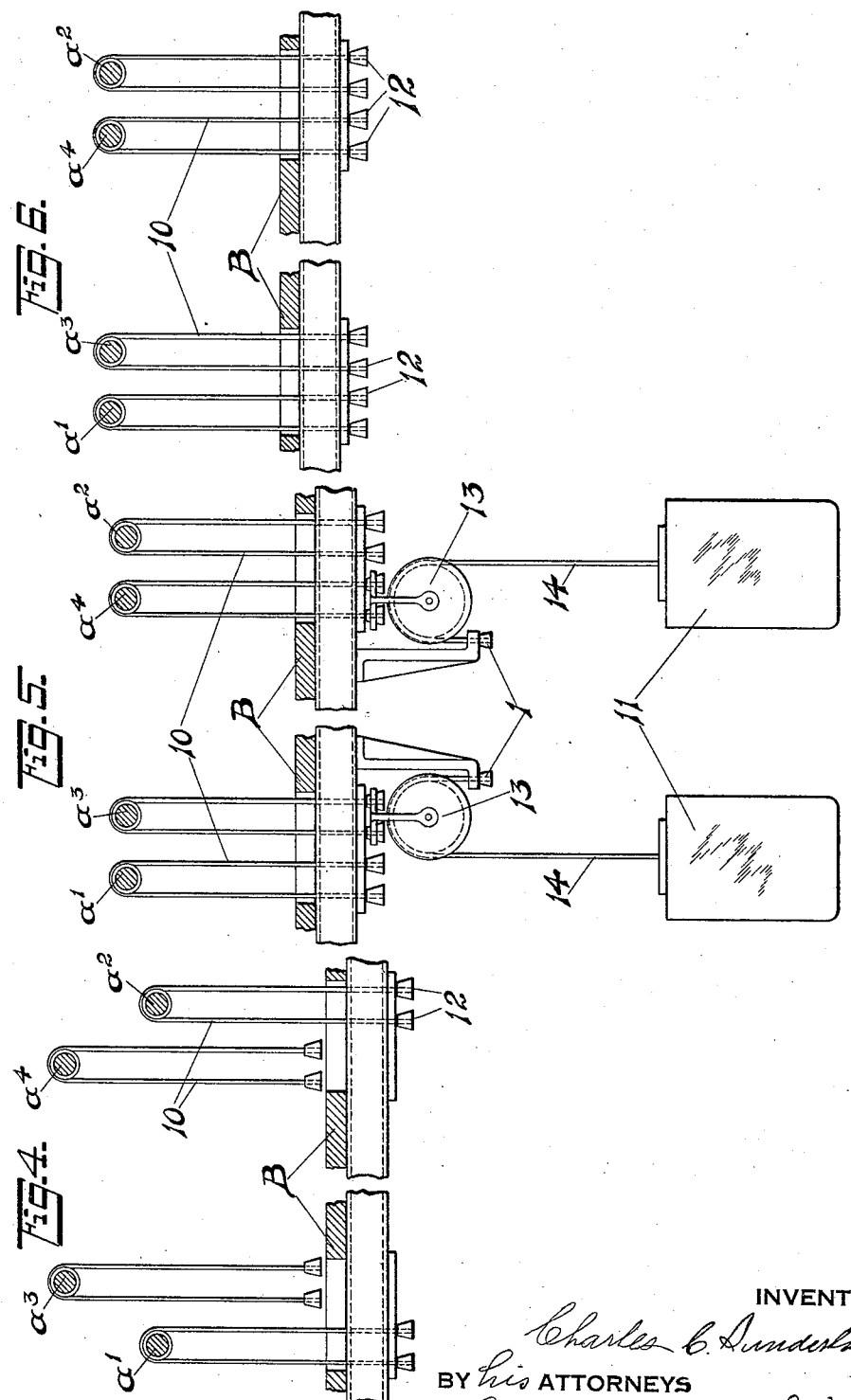
INVENTOR
Charles C. Sunderland
BY his ATTORNEYS Patented Oct. 4, 1932

1,880,290

UNITED STATES PATENT OFFICE

CHARLES C. SUNDERLAND, OF NEW BRUNSWICK, NEW JERSEY, ASSIGNOR TO JOHN A. ROEBLING'S SONS COMPANY, OF TRENTON, NEW JERSEY, A CORPORATION OF NEW JERSEY

METHOD OF TRANSFERRING LOAD IN MAKING BRIDGES AND THE LIKE

Application filed January 9, 1931. Serial No. 507,744.

This invention relates to that method of suspension bridge construction, in which part of the bridge cables are first laid and support the bridge structure during construction of the latter, and after the completion of the bridge structure and the other cables, the bridge load is transferred to all the cables. This avoids the delay incident to first laying all the cables and then building the suspended bridge structure on them. In this old method of construction assuming a four-cable bridge, two cables usually are first laid and support the bridge structure during construction, and during such construction the other two cables are laid above the two cables by which the bridge structure is supported. After all cables are completed, and the bridge is ready for transfer of load, the practice has been to run suspension loops over the upper cables which are not bearing any of the bridge load, and by jacks on each suspension loop, operated either by power or by hand operated ratchets, pull the upper cables down to the plane of the other cables and secure the suspension loops to the bridge structure. The release of the jacks then puts a part of the weight, supposedly one half the weight of the bridge structure, upon the upper cables, thus relieving the cables first laid of one half the weight of the bridge structure, with the result that all the load of the suspended bridge structure is thus transferred to all the cables and they rise to their final position.

The above old method of transferring the load from part to all of the cables, is very expensive and not satisfactory, because it is not possible to be certain as to the approximately equal division of the load between the four cables, except by tests and adjustments which involve large expense and difficulty.

The present invention relates to a new method of transferring the load from part to all of the cables in such bridge or similar construction, the object being to provide a more simple, cheap and quick method, and especially to avoid the expensive and difficult tests and adjustments heretofore necessary for loading all the cables equally.

In accordance with the present invention, the bridge or similar construction proceeds up to the completion of the bridge structure and upper cables in the same manner as above described, but the load is then transferred from the lower cable or cables to the upper cable or cables by loading the suspension loops from the upper cables by water tanks for the full weight or desired portion of the weight of the bridge structure, and the proper portion of the load is transferred from the lower to the upper cables by the release of the water from the tanks and their removal, when the cables and bridge structure will take their normal and intended position, each bearing its proper portion of the load, which may be adjusted accurately by the accurate and convenient determination of the weight of water used in addition to the tanks. The method is applicable with two or any larger number of cables and with any portion of the cables supporting the bridge structure during construction.

For a full understanding of the invention a description of preferred methods embodying the invention will now be given in connection with the accompanying drawings forming a part of this specification, and showing the means for carrying out the method in connection with a four cable suspension bridge, and the features forming the invention will then be specifically pointed out in the claims.

In the drawings:

Figure 1 is a diagrammatic side elevation of a bridge structure with the upper cables in position and tanks attached for loading them;

Figure 2 is a diagrammatic cross section looking to the left from line 2 of Figure 1;

Figure 3 is a view similar to Figure 2, showing in full lines the cables in position ready for transfer of load by release of the water in the tanks and removal of the tanks and in dotted lines the position of the cables after the transfer of bridge load to all of the cables;

Figures 4, 5 and 6 are diagrammatic views similar to Figures 2 and 3 illustrating a modified method embodying the invention and in which less weight of tanks and water is required, Figure 4 showing the cables and bridge structure in their position with the upper cables ready for transfer of load, Figure 5 showing a part of the load transferred to the upper cables and Figure 6 showing the final position of the cables and bridge structure with the load borne equally by all the cables.

In the drawings, A are the bridge towers, between which the bridge structure B is suspended by the four cables $a^1, a^2, a^3, a^4$. 10 are suspension loops hung over the upper and lower cables by which the bridge structure is supported, the suspension loops over the upper cables carrying temporarily for transfer of load, water tanks 11, and which suspension loops are all connected to the bridge structure finally by connections as indicated at 12.

In carrying out the method as illustrated in Figures 1 to 3, and assuming that the bridge structure involves a load of 480,000 pounds, this entire bridge load will be carried during construction by cables $a^1, a^2$, each carrying 240,000 pounds, as shown in Figures 1 and 2, and the cables $a^3, a^4$ in these figures are carrying no bridge load. For the transfer of the load from cables $a^1, a^2$ to all the cables, the tanks 11 on the cables $a^3, a^4$ are applied on the suspension loops and supplied with water until the load on these cables is the same as on cables $a^1, a^2$, that is, 240,000 pounds on each cable, which will lower the cables $a^3, a^4$ into the plane of the cables $a^1, a^2$ as shown in full lines in Figure 3. In this position of cables $a^3, a^4$, they are secured to the bridge structure, as indicated by the connections 12, and the water is then released from the tanks and the tanks removed from the suspension loops, the cables $a^3, a^4$ then taking one half of the bridge load, that is, 240,000 pounds or 120,000 pounds each and cables $a^1, a^2, a^3, a^4$, with the bridge structure rising to their final position shown by dotted lines in Figure 3.

The method illustrated in Figures 4, 5 and 6 employs the same principle as that illustrated in Figures 1 to 3 and above described, but only a portion of the final load on the upper cables is applied in the tanks and water, and the load is transferred to the upper cables in two steps, part of the required load being first transferred to the upper cables and then the remaining portion of such load.

In Figure 4, the cables and bridge structure are shown in their position with the lower cables $a^1, a^2$ carrying the full bridge load, and the upper cables $a^3, a^4$ carrying no load. The upper cables $a^3, a^4$ are now connected to the bridge structure and to the tanks 11 by connecting to suspension loops 10 on cables $a^3, a^4$, sheaves 13, over which run cables 14, one end of which cables 13 is secured to the bridge structure as at 1, and the other end connected to a water tank 11 and the tanks are then filled with water to transfer a part of the load to the cables $a^3, a^4$, this load thus bringing the cable $a^3, a^4$ into the same plane as cables $a^1, a^2$, which, with the bridge structure, rise somewhat on the release from them of part of the bridge load thus transferred to the cables $a^3, a^4$.

Assuming that 160,000 pounds of the total bridge load of 480,000 pounds is thus transferred to cables $a^3, a^4$, 80,000 pounds to each cable, leaving 320,000 pounds on the bridge cables $a^1, a^2$, 160,000 pounds on each cable, the position of the cables and bridge structure is as indicated in Figure 5.

The suspension loops 10 on cables $a^3, a^4$ are now secured to the bridge structure by connections 12, the water run out of the water tanks and the tanks removed, and the bridge load is thus transferred equally to all the four cables, the cables and bridge structure then rising into their final position with each cable supporting 120,000 pounds load, as indicated in Figure 6.

The method illustrated in Figures 4 to 6 will usually be found preferable to that illustrated in Figures 1 to 3, because of the less outside weight to be provided on the upper cables for transfer of load, but either of these methods will be found simple, cheap and quick as compared with previous methods used in such load transfer.

It will be understood that the invention is not limited to the details of either of the methods illustrated and above described, but that such method may readily be modified by those skilled in the art, while retaining the invention defined by the claims.

What I claim is:

1. The method of transferring a bridge load from some to all of the bridge supporting cables, which consists in first supporting the bridge structure by a lower cable or cables, then loading the upper cable or cables with weights equivalent to the bridge load or a desired part thereof, and then connecting the weight loaded cable or cables to the bridge structure for supporting the latter, and removing the weights.

2. The method of transferring a bridge load from some to all of the bridge supporting cables, which consists in first supporting the bridge structure by a lower cable or cables, then loading the upper cable or cables with weights consisting of tanks and liquid equivalent to the bridge load or a desired part thereof, and then connecting the weight loaded cable or cables to the bridge structure for supporting the latter, and drawing off the liquid from the tanks.

In testimony whereof, I have hereunto set my hand.

CHARLES C. SUNDERLAND.